United States Patent Office 3,645,946
Patented Feb. 29, 1972

3,645,946
WAX COMPOSITION
Stuart Lyman, Chicago, Ill., assignor to Surety
Manufacturing Co., Inc., Dolton, Ill.
No Drawing. Filed June 23, 1969, Ser. No. 835,803
Int. Cl. C08g 51/52
U.S. Cl. 260—28                      5 Claims

ABSTRACT OF THE DISCLOSURE

A water-dispersible wax composition comprising a silicone, a cationic surfactant, a wax-like binder, an inorganic carrier having a high surface area, and a free flow agent.

This invention relates to wax compositions, and more particularly to wax compositions, which can be applied with water as a vehicle.

Various so-called "wax" compositions are known for use on painted surfaces, such as those on automobiles, which may be applied in an aqueous spray. However, such "waxes" frequently contain a hydrocarbon such as kerosene which, when applied to the surface of an automobile, cause water to bead, and thus give the appearance of a waxed surface. However, after a short time, the hydrocarbon volatilizes and the glossy appearance of the finish disappears.

It is accordingly an object of the present invention to provide a wax composition which can be applied in water as a vehicle.

It is another object of the invention to provide a wax composition which will impart a lasting high gloss finish.

It is yet another object of the invention to provide a wax composition which is capable of being formed into pellets or tablets.

It is a further object of the present invention to provide a wax composition which is capable of being dispersed in water from a pelletized form.

It is another object of the invention to provide a wax composition which will be dispersed in water at a fairly constant rate.

It is an object of the present invention to provide a wax composition which is capable of being used in a spraying device.

These and other objects of the invention will appear hereinafter, and it will be understood that the specific examples are provided for illustration and are not intended to limit the scope of the invention.

The wax composition according to the present invention generally comprises a silicone, a cationic emulsifier, a binder, a carrier, a free flow agent, and a common solvent. It has been found that this wax composition can be conveniently and inexpensively formed into tablets or pellets. A dispersion of the wax composition in water can be formed by passing a stream of water in contact with the tablet, whereby the dispersion is formed at a fairly constant rate in the water stream. The dispersion-containing stream is directed toward the surface to be treated, and is found to impart a lasting high-gloss wax coating thereon.

The silicones generally preferred for use in the composition of the present invention are polysiloxanes having the recurring unit:

(R$_2$SiO)$_n$ wherein R is H, lower alkyl, such as methyl, ethyl, propyl, etc., having 1 to 6 carbon atoms, and phenyl; and $n$ is an integer. Of the foregoing polysiloxanes, it is preferred to use the dimethyl siloxane since it is more readily available.

The molecular weight of polysiloxane used is not critical in that any polysiloxane which is soluble in the solvent may be employed. In general, it is preferred to employ a polysiloxane, or a mixture of polysiloxanes, which has a molecular weight such that the viscosity falls within the range of 10 to 100,000 centistokes. Higher molecular weight polysiloxanes may be used, but increased amounts of solvent must likewise be employed.

The quaternary ammonium salts are recognized cationic surfactants, and generally have the formula:

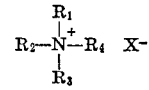

wherein $R_1$, $R_2$, $R_3$, and $R_4$ are moieties which collectively do not impair the cationic characteristics of the surfactant.

It is believed that the function of the cationic surfactant is threefold. In the first place, it is thought that the surfactant assists in the dispersion of the silicone (or silicone plus solvent) in a water stream. Second, it promotes even flow of the silicone over the surface treated to minimize the contact angle at the interface between the surface and silicone. Finally it causes the silicone to adhere more firmly to the surface due to the affinity of the nitrogen for the surface.

It is known that cationic surfactants have a molecular structure such that one portion of the molecule has hydrophilic or water-seeking characteristics and another portion has lipophilic or oil-seeking characteristics. Thus, the hydrophilic portion of the molecule is soluble in an aqueous phase, and the lipophilic portion of the molecule is soluble in the oily or organic phase. Since two portions of the same molecule are soluble in two distinct phases, the molecule serves to promote contact between the two phases.

As will be appreciated, if the lipophilic moieties of the molecule collectively are sufficient chain length, they will impair solubility of the entire molecule in the aqueous phase, and therefore impair the surfactant characteristics.

It is generally preferred that $R_1$ and $R_3$ be alkyl, such as methyl, ethyl, propyl, t-butyl, etc., having 1 to 6 carbon atoms, cycloalkyl, such as cyclopropyl, cyclobutyl, cyclohexyl, etc., having 3–7 carbon atoms, aryl, such as phenyl, naphthyl, etc., having 6 to 10 carbon atoms and aralkyl, such as benzyl, phenyl ethyl, phenyl propyl, naphthyl methyl, naphthyl ethyl, etc., having 7 to 15 carbon atoms.

$R_2$ and $R_4$ are generally alkyl, such as octyl, nonyl, decyl, dodecyl, etc., having 3 to 20 carbon atoms; cycloalkyl, such as cyclohexyl, cyclobutyl, etc., having 3–16 carbon atoms; aryl, such as phenyl naphthyl, etc., having 6–10 carbon atoms; aralkyl, such as benzyl, phenylethyl, phenyl propyl, naphthyl methyl, naphthyl ethyl, etc., having 7–15 carbon atoms; aryloxy alkyl, such as phenyloxy octyl, phenyloxy nonyl, naphthyloxy decyl, etc., wherein the aryl group is phenyl or naphthyl and the alkyl group contains 1 to 20 carbon atoms; alkyloxy such as octyloxy, nonyloxy, etc., octyloxy ethyl, etc.; alkyloxy alkyl and polyoxy alkylene, such as polyoxy ethylene and polyoxy propylene, etc., wherein the alkyl or alkylene groups contain 1 to 20 carbon atoms; as well as a variety of other moieties.

Quaternary ammonium salt surfactants, and particularly the halides, are a well-known class of compounds. Representative of this group are dimethyl dilauryl ammonium chloride, diethyl decyl benzyl ammonium chloride, phenoxyethoxy ethyl dimethyl benzyl ammonium chloride, as well as many others.

It will be understood that a mixture of the foregoing quateranry ammonium salts may likewise be employed. For example, use may be made of dicoco dimethyl ammonium chloride, which is obtained from the reaction of methyl chloride and dicoco methyl amine in isopropanol and water solvent. The dicoco methyl amine is produced by reacting ammonia with coco fatty acids, derived from coconut oil, to form the nitrile. The nitrile is hydrogenated to form dicoco amine and formaldehyde is added and reduced to form the dicoco methyl amine. From 40—70% is dimethyl dilauryl ammonium chloride, and the remainder is the corresponding dimethyl dialkyl ammonium chloride; 25% is the $C_{14}$ alkyl and 5% is a mixture of the $C_{10}$, $C_{16}$, and $C_{18}$ alkyls. It is frequently desirable to use such a mixture for economic reasons.

Also contemplated for use in the invention are ethoxylated fatty amines such as dihydroxyethyl soya amine, fatty amine salts such as tallow diamine hydrochloride, imidazoline base quaternaries such as 2-dodecyl-1-methyl-1-dodecylamidoethyl-imidazolinium methyl sulfate, pyridine base quaternaries such as lauryl pyridinium chloride, and other cationic surfactants with emulsifier properties.

The binder of the composition of the present invention generally enhances the ease with which the composition can be formed into tablets. Such binders are known to the art, and are generally wax-like materials with lubricant properties.

Such binders include long-chain hydrocarbons and polymers, such as polyethylene glycols, polypropylene glycols, etc., which are solids at room temperature. Preferred binders are branched and straight chain alkanes or alkenes having 12–30 carbon atoms such as octadecane, nonadecane, octadecane and the like, and polyethylene glycols with molecular weights of up to 10,000.

The carrier of the present composition is an inorganic material having a high surface area. It is generally preferred that the carrier be at least partially soluble in water so that it can be washed away from the waxed surface with water. Preferred carriers include the alkali metal, such as sodium, potassium, lithium, etc. and alkaline earth metal, such as calcium, magnesium, etc., salts of an inorganic oxygen containing acid, such as phosphoric, sulfuric, and carbonic acids. Particularly preferred are the carbonates, sulfates, phosphates, and polyphosphates of the above metals.

The free flow agent of the present invention is preferably a hydroscopic inorganic material in the form of minute particles which insure free flow of the dry mixture during the pelletizing operation. Various water-insoluble aluminas and silicas have been found useful for this purpose. Particularly preferred is pyrogenic silica, which is produced from silicon tetrachloride. It has been found that the minute particles of the free flow agent give rise to a roller action within the powder wax composition as the particles slide against one another.

It is generally preferred to include a solvent for the silicone. The solvent is preferably one which has a relatively high vapor pressure so that it will volatilize while the composition is being sprayed or shortly after the wax contacts the surface being treated. The nature of the solvent is not critical, and any of a wide variety of solvents, such as aliphatic, cycloaliphatic and aromatic hydrocarbons, may be used. It is generally preferred that the solvent contain 7 to 20 carbon atoms. It will be understood that a mixture of hydrocarbons may also be used. Commercially available solvents such as mineral oil, mineral seal oil, kerosene, and naphtha are suitable. It is frequently preferred to use mineral spirits.

The composition of the present invention may be conveniently prepared by admixing the components together in a conventional manner to insure a homogeneous distribution. It has been found that best results are obtained when the silicone represents .05 to 20% by weight of the total composition. In the case of wax compositions which are to be pelletized, it is desirable to maintain the silicone content at 15% by weight or below. With a higher silicone content, the pellets have a tendency to become fragile.

The cationic surfactant is generally present in an amount corresponding to .01 to 20% by weight, while the binder constitutes 10–75% by weight of the compositions.

The amount of the solvent employed is not critical, and generally falls within the range of 1–20% in the composition as it is initially formed. However, it will be understood that the presence of the solvent is required only during the stage in which the composition is being mixed in order that the silicone will be uniformly dispersed over the inorganic carrier. Thereafter, the presence of the solvent is not required and it may be permitted to be volatilized. This is not detrimental to the efficacy of the composition although it is generally preferred to maintain the solvent in the composition at all times; hence it is preferred to keep the composition in a sealed container whenever practicable, both before and after pelletizing, to minimize loss of the solvent.

The amount of the free flowing agent is generally maintained below 2% to properly control the tabletting characteristics. An amount corresponding to .1–2% is therefore preferred. The balance of the composition comprises the carrier, which preferably constitutes 15–90% by weight of the composition.

The resulting composition may be, if desired, formed into pellets or tablets by any of a wide variety of methods known to those skilled in the art. However, it will be understood that use of the composition of the present invention in powdered or other forms is also contemplated.

The composition of the invention, and more particularly pellets comprising the wax compositions of the present invention, are particularly well suited for use in spray devices such as those employed with detergents. In such devices, a tablet may be inserted into a compartment in a nozzle whereby water is passed through the compartment and detergent from the pellet becomes dispersed in the water stream. Thus, in this way, the tablet comprising the wax composition of the present invention may be inserted into such a spray device, and the resulting water dispersion of the wax composition may be applied to any surface.

It has been found that tablets or pellets formed of the composition of the present invention dissolve at a fairly constant rate in spray devices of the type described above. This represents a significant advantage in that the amount of wax in the water stream does not appreciably vary over the life of the pellet. It has also been found that the pellets or tablets dissolve fairly uniformly, and do not break up into chips or pieces which would obstruct or block the nozzle.

Having described the basic concepts of the invention, reference is now made to the following examples which are provided by way of illustration, and not by way of limitation, of the invention.

EXAMPLE I

A wax composition is prepared, which has the following composition:

| | Percent |
|---|---|
| Polydimethylsiloxane with a viscosity of 100 centistokes | 6.0 |
| Dimethyl dicoco ammonium chloride (contains 70% $C_{12}$, 25% $C_{14}$ and 5% $C_{10}$, $C_{16}$ and $C_{18}$ alkyl groups) | 2.0 |
| Mineral spirits | 4.0 |
| Pyrogenic silica | 0.5 |
| Polyethylene glycol (MW 6000) | 20.0 |
| Sodium tripolyphosphate, lt. density | 67.47 |
| Pigment | 0.03 |

The components are thoroughly mixed in a mixer to insure homogeneous distribution. The resulting powder has a pale green color.

The powder is formed into a pellet approximately 2½ inches long, 1 inch wide and ⅓ inch thick, and the pellet inserted into a commercially available "Raintime" nozzle attached to a standard garden hose. It is found that ⅕ of the pellet becomes dispersed in the water passing through the nozzle in 7 minutes. No difficulty with obstruction of the nozzle was experienced.

The pigment is not an essential ingredient in the composition, and may be added so that the wax tablet may be distinguished from other types of tablets, such as detergent tablets.

EXAMPLE II

A wax of the following composition is prepared in the manner shown in Example I:

| | Percent |
|---|---|
| Polydimethylsiloxane (viscosity 500 cp.) | 10.0 |
| Dimethyl lauryl benzyl ammonium chloride | 4.0 |
| Mineral oil | 8.0 |
| Pyrogenic silica | 0.7 |
| Polyethylene glycol (MW 6000) | 18.0 |
| Sodium carbonate | 59.3 |

Comparable results are obtained when pellets made from the composition are tested in the same manner shown in Example I.

It will be understood that changes may be made in the details of operation and formulation of the invention without departing from the spirit of the invention, especially as defined in the following claims.

I claim:

1. A solid water-dispersible wax composition consisting essentially of 0.5% to 20% by weight of a polysiloxane of the formula $(R_2SiO)_n$ having a viscosity within the range of 10,000–100,000 centistokes wherein R is selected from the group consisting of hydrogen, lower alkyl or phenyl; 0.01% to 20% by weight of at least one quaternary ammonium cationic surfactant; 10–75% by weight of a wax-like binder selected from the group consisting of solid polyethylene glycols, polypropylene glycols and solid alkanes and alkenes; 15–90% by weight of an inorganic carrier selected from the group consisting of the alkali and alkaline earth metal salts of an oxygen containing inorganic acid and up to 2% by weight of a free flow agent selected from the group consisting of alumina and silica.

2. A composition as defined in claim 1 where R is methyl.

3. A composition as defined in claim 1 wherein said carrier is sodium tripolyphosphate.

4. A composition as defined in claim 1 which includes an inert organic solvent.

5. A tablet comprising the composition of claim 1 for use in a spray nozzle.

References Cited

UNITED STATES PATENTS

| | | | |
|---|---|---|---|
| 2,626,870 | 1/1953 | Cooke | 260—28 |
| 2,780,554 | 2/1957 | Lerner | 106—10 |
| 2,804,440 | 8/1957 | Brown | 260—28 |
| 2,839,482 | 6/1958 | Geen | 260—28 |
| 3,071,479 | 1/1963 | Fulenwider | 106—10 |
| 3,341,338 | 9/1967 | Pater | 106—271 |

MORRIS LIEBMAN, Primary Examiner

P. R. MICHL, Assistant Examiner

U.S. Cl. X.R.

106—10